Figure 1:
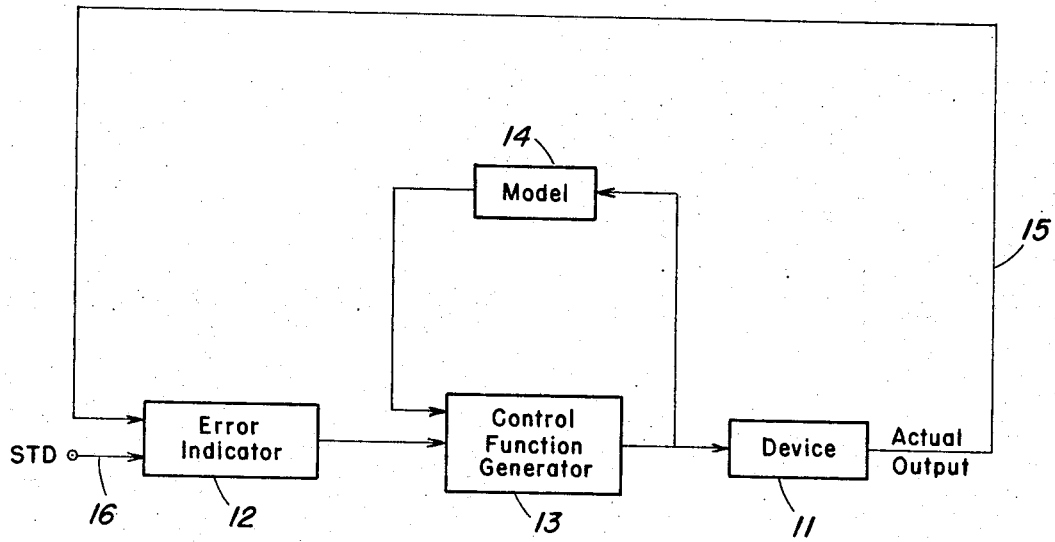

United States Patent
O'Connor et al.

[15] 3,699,989
[45] Oct. 24, 1972

[54] FEEDBACK CONTROL APPARATUS

[72] Inventors: Ward F. O'Connor, Deanville, N.J.; William George Van Vliet, Greenwich, Conn.

[73] Assignee: The Lummus Company, Bloomfield, N.J.

[22] Filed: June 18, 1970

[21] Appl. No.: 47,238

[52] U.S. Cl. ............... 137/487.5, 137/86, 251/131, 318/615, 318/609
[51] Int. Cl. ........................................... G05b 11/42
[58] Field of Search ....... 137/85, 86, 487.5; 318/615, 318/616, 610, 609; 235/151; 340/222

[56] References Cited

UNITED STATES PATENTS

| | | | |
|---|---|---|---|
| 3,394,294 | 7/1968 | Leroi | 318/615 |
| 3,533,236 | 10/1970 | Cottington | 318/609 |
| 2,948,295 | 8/1960 | Smith | 137/487.5 |
| 2,781,770 | 2/1957 | Sutton | 137/85 |
| 2,805,678 | 9/1957 | Panich | 137/86 |
| 2,896,655 | 7/1959 | Hartz | 137/86 |
| 2,638,911 | 5/1953 | Griswold | 137/86 X |

*Primary Examiner*—Alan Cohan
*Attorney*—Marn & Jangarathis

[57] ABSTRACT

Apparatus for controlling the operation of a device is disclosed in accordance with the teachings of the present invention wherein the actual operation of the device is detected by detecting means and compared to a predetermined standard of performance. Indications of the variance between the actual operation of the device and the predetermined standard of performance are utilized by control function generating means to generate a device control function which adjusts the operation of the device such that the variance is reduced to zero. The device control function is additionally applied to device simulating means which simulates the response of the device to the device control function and generates a simulating function representative of that response. The control function generating means combines the simulating function with the indicated variance to produce the control function which includes a substantially noise-free component indicative of the rate of change of the operation of the device thereby anticipating the future operation of the device.

23 Claims, 2 Drawing Figures

3,699,989

INVENTORS
Ward F. O'Connor
BY William George Van Vliet

Marn & Jangarathis
ATTORNEYS

FEEDBACK CONTROL APPARATUS

This invention relates to automatic control systems and, more particularly, to apparatus employing three simultaneous modes of operation for automatically controlling a device.

Automatic control systems are well known in the prior art for regulating the operation of a device. The device may appropriate several conventional forms such as a signal amplifier, a phase shift system, an electric motor, a chemical processing plant and other well known devices adapted to have the operation thereof adjusted for external and internal disturbances and device load variations. Generally, conventional automatic control systems are designed for precise regulation of the device in accordance with a predetermined standard which may be a dynamic controlling function. These systems may employ feedforward control or feedback control, or a combination of feedforward control or feedback controls.

The principle of operation of a feedforward control system is to detect the presence of disturbances of a variable that might deleteriously influence the operation of the device and provide compensating factors therefor. The compensating factors may cancel or minimize the disturbances, thereby reducing the effects thereof; or may provide corrective action to counteract those effects. Well known feedforward control systems that utilize minimizing compensating factors employ disturbance sensitive detecting devices coupled to the source of the variance; a compensating device responsive to the detected variable disturbance for producing the compensating factor; and a combining device for combining the variable and the compensating factor whereby the disturbance is attenuated such that it has no effect on the operation of the device to which the compensated variable is applied. An exemplary electrical feedforward control system might include transducer means for generating an electrical signal representative of the variable; differential amplifier means for detecting amplitude disturbances of the electrical signal; inverter means for producing a compensating signal having a value proportional to the detected amplitude disturbance and out of phase therewith; and algebraic summing amplifier means for combining the representative electrical signal and the compensating signal such that the amplitude disturbance of the representative electrical signal is effectively cancelled. The signal produced by the algebraic summing amplifier means may be applied directly to the device or translated into a physical quantity compatible with the operation of the device. Other conventional electrical feedforward control systems provide compensation for phase and frequency disturbances of a representative electrical signal in a manner similar to that of the aforedescribed control system.

Typical feedforward control systems that provide corrective action for a device to counteract the effects of a disturbance of a variable include disturbance sensing means coupled to the source of the variable and means responsive to the sensed disturbance to predict the consequential performance of the device thereto and to compute corrective action for the device. Hence, an electrical feedforward control system which performs this process may include a model of the device, to which is applied the disturbance containing variable, for predicting the effects the variable will have on the actual device. A characteristic model might comprise an analog representation of the device constructed of conventional circuit components; or the model might comprise a digital computer, appropriately programmed. The digital computer may advantageously compute the necessary corrective action which should be undertaken by the device to oppose the effects of the disturbances contained in the variable, and supply the device with a signal indicative of that corrective action.

Feedforward control systems are inherently stable in their operation because control of the device is independent of the output of the device. However, one disadvantage of feedforward control systems is the requirement that all disturbances that might affect the operation of the device, including internal disturbances, external disturbances and load variations, must be precisely detected. Another disadvantage is the requirement that the operation of the device, its response to changes in the variable, the time delay in responding to control signals and other critical factors must be accurately known and capable of absolute prediction. Accordingly, it is readily apparent that a complex computer system having high economic considerations, is necessary for suitable operation of a commercially acceptable feedforward control system.

The limitations described above with respect to conventional feedforward control systems have resulted in favorable acceptance of the feedback control system. Prior art feedback control systems, which may assume a variety of forms such as an electrical feedback control system, a pneumatic feedback control system or an hydraulic feedback control system, include three basic elements, viz., means for detecting the actual operation of the device; means for comparing the actual operation of the device with a predetermined standard of performance and indicating the deviation therebetween; and means for adjusting the operation of the device in accordance with the indicated deviation. In an electrical feedback control system, the actual operation of the device may be represented by the value of a variable to be controlled. If the variable is an electrical signal, i.e., voltage or current, the value thereof may be indicated as a phase shift, frequency or amplitude. If, however, the variable is a physical quantity such as pressure, force or the like, an electrical signal proportional thereto may be generated by well known electrical transducers. Similarly, the predetermined standard of performance, to which the variable to be controlled is compared, is represented by an electrical signal having a predetermined phase shift, frequency or amplitude. Hence, the deviation between the electrical signals may be facilely obtained by conventional differential amplifier means. The output signal produced by the differential amplifier means is proportional to the algebraic difference between the variable to be controlled and the predetermined standard and is utilized to control a final control element which adjusts a manipulatable variable whereby the performance of the device is regulated. It has been found that the variable to be controlled need not be of the same classification as the manipulatable variable. For example, the variable to be controlled might be in terms of pressure or current, whereas the manipulatable variable might take the form of temperature or voltage. Nevertheless, the manipulatable variable will be so adjusted by the final control element as to cause the actual operation of the device to conform to the predetermined standard of performance. Thus, the feedback control system is characterized by operating in a closed loop such that an error signal proportional to the difference between actual operation of the device and desired operation of the device is generated to control the device in a manner to reduce the error signal to zero.

Simplified feedback control systems have only a single mode of operation, commonly referred to as the proportional mode. The proportional mode of operation adjusts the performance of the device in a manner proportional to the value of the deviation between the actual operation and the desired operation of the device. Accordingly, in an electrical feedback control system the final control element has applied thereto a control signal proportional to the output signal produced by the aforedescribed differential amplifier means. The control signal may be obtained by amplifying or attenuating the output signal produced by the differential amplifier means. Theoretically, the amplitude and phase of the control signal so obtained does not vary with frequency and no time delay is introduced into the control loop. However, it is seen that a deviation between the actual operation of the device and the desired operation must always be present to produce the control signal to effect automatic control of the device when the feedback control system operates in the proportional mode.

A more efficient mode of operation of a feedback control system includes a reset, or integral mode. This mode does not require continually present deviation between actual performance and desired performance to produce a control signal but, rather, continuously amplifies the deviation with the passage of time until the deviation is reduced to zero. In an electrical feedback control system operating in the reset mode, the control signal is obtained by integrating the output signal produced by the differential amplifier means. When that output signal is reduced to zero, the control signal, by the process of integration, remains at its immediately preceding value which is the precise value required to maintain the final control element in the condition necessary for the actual operation of the device to conform to the predetermined standard of performance. The amplitude of the integrated control signal tends to decrease linearly as the frequency of the output signal produced by the differential amplifier means increases, thereby attenuating undesirable noise signals. Unfortunately, the frequency dependent characteristics of reset mode operation introduce time delays in the feedback control loop thereby causing the actual operation of the device to oscillate about the predetermined standard of performance. In other words, the control signal will not reach its proper value at the time the output signal produced by the differential amplifier means is zero and the performance of the device cannot be stabilized at zero deviation.

The instability of the reset mode of operation may be compensated by including the well known rate mode of operation. This latter mode controls the performance of the device in accordance with the rate of change of the deviation between actual operation and desired operation of the device and, consequently, the deviation of operation is anticipated. In conventional electrical feedback control systems including a rate mode of operation, the control signal is obtained by differentiating the output signal produced by the differential amplifier means. Hence, the control signal is proportional to the slope of a graphical representation of the output signal and indicates whether the actual operation of the device is approaching the predetermined standard of performance. As is understood, the control signal obtained by the rate mode of operation is not dependent upon the value of the output signal but only upon the rate of change thereof. The final control element is thereby adjusted in anticipation of future operation of the device; and the device is rapidly brought to conform to the predetermined standard of performance. It is seen that the rate mode of operation introduces a leading factor into the time of response of the control loop which advantageously counteracts the time delay introduced by the reset mode of operation. However, the amplitude of the differentiated control signal produced in the rate mode of operation increases linearly with an increase in frequency, thereby amplifying undesirable noise which causes errors in the feedback control loop.

A typical prior art electrical feedback control system combining the proportional, reset and rate modes of operation is described in U.S. Pat. No. 2,946,943 which issued to D.D. Nye et al., on July 26, 1960. Analogous fluidic feedback control systems are described at pages 22–76 through 22–80 of the fourth edition of Perry's *Chemical Engineers' Handbook*, published in 1963 by McGraw-Hill, Inc.

As aforedescribed, the principal disadvantage of prior art feedback control systems originates with the rate mode apparatus. Amplification by this apparatus of spurious noise signals that originate in commercially available transducers have resulted in unreliable and unacceptable control systems. If the rate mode is omitted, however, the deficiencies above-mentioned with respect to proportional mode and reset mode operation are more pronounced. The technique heretofore employed to negate the effects of amplification of these noise signals has been to remove the spurious noise signals by conventional filter means. However, a truly effective filter introduces a large delay in the response time of the control loop, thereby frustrating the aforementioned advantages derived from rate mode operation.

Therefore, it is an object of this invention to provide apparatus for automatically controlling the operation of a device.

It is another object of the present invention to provide a feedback control system for stabilizing the operation of a device in accordance with a predetermined standard of performance.

It is still another object of the present invention to provide substantially noise-free apparatus having a minimal time of response for regulating a processing system.

It is yet another object of the present invention to provide a feedback control system including apparatus operating in a substantially noise-free rate mode with a minimal time of response for regulating a device.

Various other objects and advantages of the invention will become clear from the following detailed description of embodiments thereof, and the novel features will be particularly pointed out in connection with the appended claims.

In accordance with this invention, apparatus for controlling the operation of a device is provided wherein detecting means detects the actual operation of said device; simulating means for simulating the physical characteristics of said device produces simulated representations of the operation thereof in response to a control function; error indicating means produces indications proportional to the variance between the actual operation of said device and a predetermined standard of performance; and control function generating means responsive to said simulated representations of the operation of said device and said indications produced by said error indicating means generates said control function such that said control function includes a substantially noise-free component indicative of the rate of change of the operation of said device whereby the future operation of said device is anticipated and present operation of the device is controlled in accordance therewith.

Figure 2:
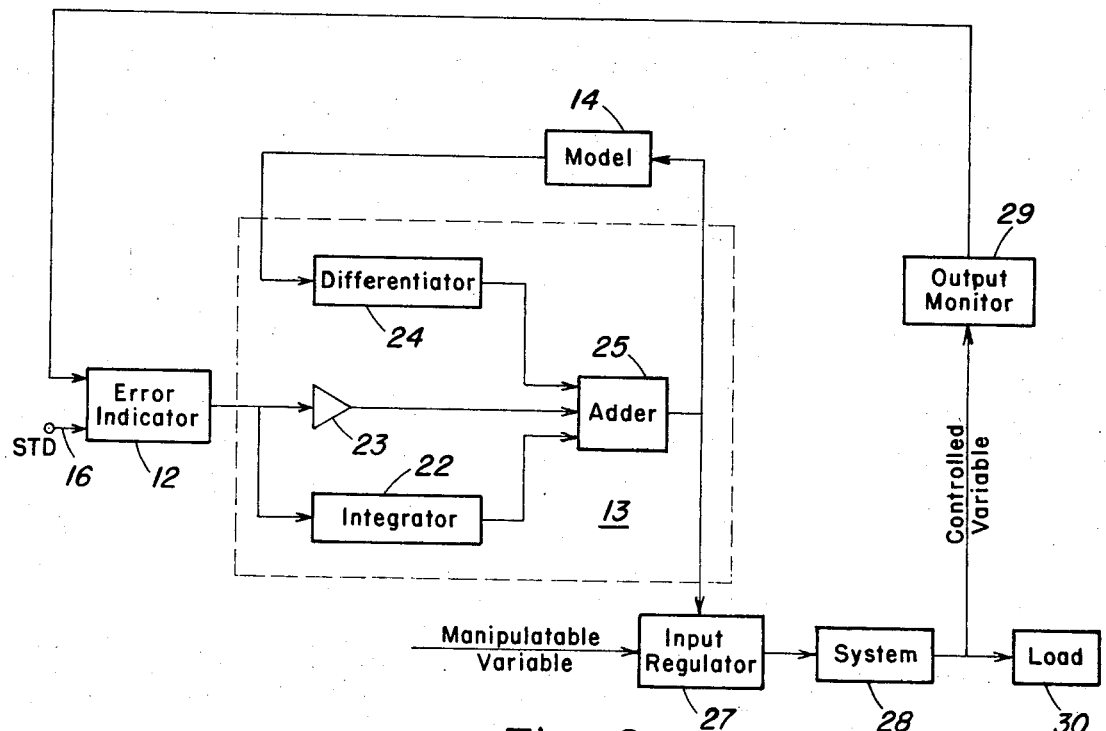

The invention will be more clearly understood by reference to the following detailed description of exemplary embodiments thereof in conjunction with the accompanying drawings in which:

FIG. 1 is a block diagram of a control system in accordance with the present invention; and FIG. 2 is a more detailed block diagram of the apparatus of the present invention.

Referring now to the drawings, wherein like reference numerals are used throughout, and in particular to FIG. 1, there is illustrated a control system for controlling the operation of a device in accordance with the present invention including the device 11, error indicating means 12, control function generating means 13 and simulating means 14. Device 11 may be an electrical device, a mechanical device, an electromechanical device or a fluidic device capable of operating on a variable and adapted to vary its operation in accordance with a control function. Illustrative devices may include an electrical amplifier having an adjustable amplification factor for amplifying a current or voltage; an adjustable phase shifter for shifting the phase of a current or voltage; a frequency generator for generating an electrical signal, the frequency of which may be regulated by a controlling function. Other devices may include speed controlled motors; pressure or temperature controlled processing systems; or mechanical balancing devices. The foregoing devices are characterized by operating on a variable and producing an indication of the performance of that operation. For example, an electrical amplifier performs the operation of amplifying a voltage (the voltage being a variable) the performance of which is indicated by the value of the amplified voltage. For convenience, the amplified voltage may be considered the controlled variable and the gain of the amplifier the manipulatable variable. Similarly, in a processing system where the pressure of a fluid must be regulated for proper control of the process, the performance of that process might be indicated by the pressure of the fluid (the pressure being the controlled variable) and the flow of the fluid through the system might be the manipulatable variable. It is readily seen that the manipulatable variable and the controlled variable need not necessarily be of the same physical characteristics. This is especially true in industrial process control systems.

The controlled variable, which represents the actual operation of the device 11 is applied to error indicating means 12 by coupling means 15. If the controlled variable is an electrical signal, coupling means 15 may comprise electrical connecting means, such as conducting leads; if, however, the controlled variable is a fluid pressure, i.e., pneumatic or hydraulic pressure, coupling means 15 may comprise conduit means. It should be readily apparent that the controlled variable may be translated into a representative electrical signal by well known transducer means.

Error indicating means 12 is adapted to indicate the variance between the controlled variable and a predetermined standard of performance, commonly referred to as the set point. The predetermined standard of performance may be represented by a physical quantity compatible with the controlled variable and is supplied to error indicating means 12 via connecting means 16. Thus, if the controlled variable is an electrical voltage, the predetermined standard of performance may be an electrical voltage. Similarly, if the controlled variable is a fluidic pressure, the predetermined standard of performance may be a fluidic pressure. The variance indicated by the error indicating means 12 is applied to control function generating means 13 wherein it is combined with a further function to generate the control function for regulating the operation of device 11. Conveniently, the control function may obtain a physical quantity similar to that of the controlled variable. The control function is additionally supplied to simulating means 14 which utilizes the control function to produce the aforementioned further function. The simulating means 14 may be a model of the device 11 and is adapted to produce the further function in response to the supplied control function; hence, the further function is a simulated representation of the controlled variable supplied to connecting means 15 by device 11. Simulating means 14 may comprise a simple and economical electrical analog of device 11, which analog admits of a time constant substantially equal to the time constants of the device, and a transfer function substantially identical to the transfer function of device 11; or simulating means 14 may comprise a mechanical or fluidic analog of device 11. Typical electrical analogs are manufactured by Electronics Associates, Incorporated of Long Branch, New Jersey. If desired, simulating means 14 may comprise a programmed digital computer. It, of course, is understood that the structure of simulating means 14 is dependent upon the choice of components employed in the control system of the present invention. Clearly, transducers may be utilized throughout to interchange physical characteristics and electrical signals.

The operation of the apparatus illustrated in FIG. 1 will now be described. The controlled variable, representative of the actual operation of the device 11, is generated in the well known manner. For purposes of this description it will be assumed that the controlled variable is indicated by an electrical voltage; however, as will be subsequently explained, other physical quantities may be employed to represent the operation of device 11. Error indicating means 12 is provided via connecting means 15 with the electrical voltage representative of the actual operation of device 11, and via connecting means 16 with an electrical voltage representative of the predetermined standard of performance to which the operation of device 11 is to conform. If both voltages applied to error indicating means 12 are DC voltages, the variance therebetween may be indicated by a voltage (hereinafter the error signal) which is a DC voltage proportional to the algebraic difference between the applied voltages. Accordingly, error indicating means 12 may be conventional differential amplifying means. It is understood by those skilled in the art that the voltages applied to error indicating means 12 may be AC voltages, whereby the error signal produced by differential amplifying means is also an AC voltage. In addition, if the actual operation of the device is represented by the phase of an electrical signal, error indicating means 12 may comprise phase comparison means for generating an error signal proportional to the difference in phase of the signals provided by connecting means 15 and 16, respectively.

Control function generating means 13 is supplied with the error signal produced by error indicating means 12, and combines the error signal with a simulating signal produced by simulating means 14, which simulating signal denotes the simulated operation of device 11, to produce a device control signal. A detailed explanation of the operation of control function generating means 13 is deferred for the present time as such explanation is not necessary for an adequate understanding of the operation of the apparatus of FIG. 1. The device control signal is applied to the device 11 in a manner that regulates the operation thereof so that device 11 operates in accordance with the predetermined standard of performance. In other words, the device control signal adjusts the operation of device 11 whereby the signal appearing on connecting means 15 tends to obtain a value equal to that of the signal appearing on connecting means 16, and the error signal is reduced to zero. If device 11 is an electrical amplifier, the device control signal applied thereto might be an automatic gain control signal. Similarly, if device 11 is a process control system, the device control signal might be a valve control signal, for example. Since indications of the actual operation of device 11 are employed to regulate the operation thereof, or otherwise stated, an output signal of device 11 controls an input signal applied thereto, it is readily seen that the control apparatus of FIG. 1 functions as a feedback control system.

As illustrated in FIG. 1, the device control signal produced by control function generating means 13 is additionally applied to simulating means 14. Whereas simulating means 14 is a model of the device 11, the signal produced thereby in response to the device control signal is substantially equal to the signal appearing on connecting means 15. Hence, simulating means 14 responds to the device control signal in the same manner as the device 11; however, spurious noise signals that might be produced by the device 11 do not appear in the signal (hereinafter simulated signal) produced by simulating means 14. The simulated signal, which is a noise-free indication of the actual operation of device 11, is combined with the error signal in control function generating means 13 to produce the control signal in a manner subsequently described. It is readily seen that simulating means 14 may comprise a digital computer, appropriately programmed to function as a replica of the device 11.

FIG. 2 is a more detailed block diagram of the feedback control system illustrated in FIG. 1 and comprises a processing system 28, input regulating means 27, operation monitoring means 29, error indicating means 12, control function generating means 13 and simulating means 14. Input regulating means 27 may comprise a conventional final control element such as a Fisher valve or a Conoflow valve responsive to a pneumatic control signal applied thereto, or a fluid valve having an electrically controlled actuator means, well known in the process control art, such as the valves manufactured by Fisher Controls of Marshalltown, Iowa. Input regulating means 27 is coupled to the processing system 28. The processing system 28 is similar to the device 11 of FIG. 1 and may comprise a processing plant adapted to operate on a plurality of process variables, and capable of driving a load 30. For purposes of simplification, only a single manipulatable process variable is illustrated in FIG. 2. The operation of processing system 28 may be detected by output monitoring means 29 which may comprise a commercially available electrical transducer means for generating an electrical signal in response to the controlled variable applied thereto. It is understood that output monitoring means 29 is not limited solely to electrical transducer means and may typically include means well known in the prior art to produce a fluidic pressure in response to the controlled variable. Connecting means 15 couples output monitoring means 29 to error indicating means 12 which, in turn, is coupled to control function generating means 13.

Control function generating means 13 is comprised of rate of change detecting means 24, gain producing means 23, integrating means 22 and combining means 25. Rate of change detecting means 24 is adapted to indicate the rate of change of a function applied thereto and may comprise conventional electrical differentiating means whereby an output signal proportional to the rate of change of an input signal is produced. Well known differentiating means may include operational amplifiers or resistance-capacitance networks or the like. Gain producing means 23 is designed to produce an output signal proportional to the value of an applied input signal. The proportionality factor may be greater or less than unity. Accordingly, gain producing means 23 may comprise an amplifier or attenuator. If desired, the gain of the amplifier may be adjustable. Integrating means 22 is capable of continuously amplifying an input signal with the passage of time whereby an output signal proportional to the integral of the input signal is produced. Integrating means 22 may comprise well known electrical integrators such as an operational amplifier integrator or a resistance-capacitance circuit commonly used in the prior art. Combining means 25 may comprise algebraic summation amplifier means to algebraically add the respective signals produced by rate of change detecting means 24, gain producing means 23 and integrating means 22. As indicated in FIG. 2, rate of change detecting means 24 of control function generating means 13 is coupled to simulating means 14, and gain producing means 23 and integrating means 22 are connected in common to error indicating means 12. The output of combining means 25 is coupled to input regulating means 27 and to simulating means 14.

A description of the operation of the control system illustrated in FIG. 2 now follows, wherein it is initially assumed that the apparatus shown is electrical apparatus. The operating condition of processing system 28 may be detected in the well known manner by monitoring a controlled variable. Hence, the signal produced by operation monitoring means 29 is a direct representation of the operating condition of processing system 28. Connecting means 15 applies this signal to error indicating means 12 wherein it is compared to a predetermined standard of performance as aforedescribed with respect to FIG. 1. Accordingly, the error signal produced by error indicating means 12 is proportional to the difference between an actual output signal of processing system 28 and a desired output signal. Stated otherwise, the error signal is proportional to the variance between the actual operation of processing system 28 and a predetermined standard to which it is desired the operation of processing system 28 conform. The error signal is received by gain producing means 23 at an input thereof and an output signal proportional to the value of the error signal is produced and coupled as a control signal component to input regulating means 27 by combining means 25. Thus, it is seen that input regulating means 27 adjusts the operation of processing system 28 by regulating the manipulatable variable in accordance with the magnitude of the variance between the actual operation of processing system 28 and the predetermined standard of performance.

The error signal is additionally received by integrating means 22 which produces an output signal proportional to the time integral of the error signal. This integrated signal is coupled as a control signal component to input regulating means 27 via combining means 25 whereby the operation of processing system 28 is controlled accordingly. It should now be apparent that gain producing means 23 provides proportional mode control of the processing system 28 and integrating means 22 provides reset mode control thereof.

The aforedescribed disadvantages inherent in proportional mode control and reset mode control are overcome by the present invention in a manner now explained. Simulating means 14, which was described in detail with respect to FIG. 1, responds to the control signal applied thereto in a manner which simulates the response of processing system 28. Thus, the simulated signal produced by simulating means 14 is substantially equal to and varies directly as the signal produced by operation monitoring means 29. However, since simulating means 14 is a model of processing system 28 and input regulating means 27, represented, for example, by an electrical analog computer such as that manufactured by Electronics Associates, Incorporated or a digital computer, the simulated signal will not include undesired spurious noise signals that may be produced by processing system 28 or operation monitoring means 29. The rate of change of the simulated signal, which necessarily corresponds to the rate of change of the operation of processing system 28, is detected by rate of change detecting means 24 and is coupled as a control signal component to input regulating means 27 via combining means 25. Therefore, it is readily apparent that the rate of change of the simulated signal provides a prediction of the future operation of processing system 28 and affords an anticipating control therefor. Consequently, the operation of processing system 28 is rapidly and stably brought into conformance with the predetermined standard of performance. Furthermore, the rate of change of the simulated signal will contain only a negligible noise component because the simulated signal produced by simulating means 14 is virtually noise-free.

Although the foregoing has described the operation of an electrical feedback control system, it should be understood that a fluidic feedback control system is within the scope of the present invention. For example, well known pneumatic or hydraulic pressure devices that are analogous to the electrical components previously described may be employed. The differential amplifier that may comprise error detecting means 12 may be replaced by fluid pressure proportional control devices set forth on pages 22-76 through 22-77 and pages 22-79 through 22-80 of Perry's *Chemical Engineers' Handbook* (4th edition). Integrating means 22 may be replaced by the proportional plus reset control mode apparatus described at pages 22-77 and 22-80 of the aforementioned publication. And proportional plus rate control apparatus of the type shown at pages 22-77 and 22-80 of the *Chemical Engineers' Handbook* may be substituted fro the differentiator which may comprise rate of change detecting means 24. Alternatively, control function generating means 13 may be replaced by the illustrative proportional-plus-reset-plus derivative stack-type pneumatic controllers described at pages 22-79 through 22-81 of the *Chemical Engineers' Handbook*, or by the proportional-plus-reset-plus-rate hydraulic controlling means of FIG. 22-179 on page 22-82 of the aforementioned *Handbook*. Furthermore, mechanical analogs of the electrical components illustrated in FIGS. 1 and 2 are well known in the prior art and may be substituted therefor.

While the invention has been particularly shown and described with reference to specific embodiments thereof, it will be obvious to those skilled in the art that the foregoing and various other changes and modifications in form and details may be made without departing from the spirit and scope of the invention. It is, therefore, intended that the appended claims be interpreted as including all such changes and modifications.

What is claimed is:

1. Apparatus for controlling the operation of a device, said device producing an actual output signal representative of the actual operation thereof, comprising:

means for providing a signal indicative of a desired output signal to be produced by said device;

error detecting means for producing an error signal when said actual output signal produced by said device differs from said desired output signal;

device simulating means for simulating physical characteristics of said device including the time constants thereof and responsive to a control signal for producing a further signal substantially equal to said actual output signal; and control signal generating means coupled to said error detecting means and including differentiating means coupled to said device simulating means for generating said control signal having a component proportional to said error signal and another component proportional to the rate of change of said further signal whereby said control signal is adapted to be applied to said devices such that said actual output signal tends to be equal to said desired output signal thereby minimizing said error signal.

2. Apparatus in accordance with claim 1 wherein said control signal generating means further comprises:

amplifying means coupled to said error detecting means for producing a signal proportional to the value of said error signal; and combining means coupled to said differentiating means and said amplifying means for combining the signals produced by said differentiating means and said amplifying means.

3. Apparatus in accordance with claim 1 wherein said control signal generating means further comprises:

integrating means coupled to said error detecting means for producing a signal proportional to the integral of said error signal; and combining means coupled to said differentiating means and said integrating means for combining the signals produced by said differentiating means and said integrating means.

4. Apparatus in accordance with claim 1 wherein said control signal generating means further comprises:

amplifying means coupled to said error detecting means for producing a signal proportional to the value of said error signal;

integrating means coupled to said error detecting means for producing a signal proportional to the integral of said error signal; and combining means coupled to said differentiating means, said amplifying means and said integrating means for combining the signals produced by said differentiating means, said amplifying means and said integrating means.

5. Apparatus in accordance with claim 4 wherein said combining means comprises algebraic summing means.

6. Apparatus in accordance with claim 4 wherein said device simulating means comprises an electrical analog model of said device and said further signal produced thereby is an electrical signal having a negligible noise component.

7. Apparatus in accordance with claim 4 wherein said device simulating means comprises a digital computer model of said device and said further signal produced thereby is an electrical signal having a negligible noise component.

8. Apparatus in accordance with claim 4 wherein said error detecting means comprises differential amplifier means including a first input terminal supplied with said desired output signal and a second input terminal supplied with said actual output signal whereby said error signal is proportional to the algebraic difference between said desired output signal and said actual output signal.

9. Apparatus for controlling the operation of a device comprising:

detecting means for detecting the actual operation of said device;

simulating means for simulating the physical characteristics of said device, including the time constant thereof; said simulating means responding to control functions applied thereto for producing simulated representations of the operation of said device;

error indicating means coupled to said detecting means for producing indications proportional to the variance between the actual operation of said device and a predetermined standard of performance;

control function generating means coupled to said simulating means and said error indicating means for generating said control function such that said control function includes a component indicative of the rate of change of said simulated representations of the operation of said device whereby the future operation of said device may be anticipated; said component including negligible noise disturbances;

and means for applying said control function to said device so that the actual operation thereof tends to conform in a stable manner to said predetermined standard of performance.

10. Apparatus for controlling the performance of a processing system comprising:

regulating means for regulating a process variable in accordance with a control function;

monitor means for monitoring the operation of said processing system and for producing indications of the actual operation thereof;

means for simulating physical characteristics of said regulating means and said processing system, including the time constants thereof, and responsive to said control function for producing simulated indications of said operation;

error means for generating manifestations of the variance between the actual operation of said processing system and a predetermined standard of performance;

first means coupled to said error means for producing first representations of the value of said generated manifestations;

second means coupled to said error means for producing second representations of the integral of said generated manifestations;

third means coupled to said means for simulating for producing third representations of the rate of change of said simulated indications of said operation; and combining means for combining said first, said second and said third representations to produce said control function.

11. Apparatus in accordance with claim 10 wherein said means for simulating comprises a model of said regulating means and said processing system.

12. Apparatus in accordance with claim 11 wherein said model comprises electrical analog means such that said simulated indications are electrical signals having negligible electrical noise disturbances.

13. Apparatus in accordance with claim 12 wherein said monitor means comprises transducer means such that said produced indications are electrical signals.

14. Apparatus in accordance with claim 13 wherein said error means comprises differential amplifier means including a first input terminal supplied with electrical signals representative of said predetermined standard of performance and a second input terminal supplied with said electrical signals produced by said transducer means whereby said generated manifestations are electrical signals proportional to the algebraic difference between said electrical signals representative of said predetermined standard of performance and said electrical signals produced by said transducer means.

15. Apparatus in accordance with claim 14 wherein said first means comprises electrical amplifying means whereby said first representations are first electrical signals having amplitudes proportional to the value of the electrical signals generated by said differential amplifier means; said second means comprises electrical integrating means whereby said second representations are second electrical signals having amplitudes proportional to the integral of the electrical signals generated by said differential amplifier means; and said third means comprises electrical differentiating means whereby said third representations are third electrical signals having amplitudes proportional to the rate of change of said electrical signals produced by said electrical analog means.

16. Apparatus in accordance with claim 15 wherein said combining means comprises electrical summation amplifier means such that said control function is an electrical signal proportional to the algebraic addition of said first, said second and said third electrical signals.

17. Apparatus in accordance with claim 16 wherein said regulating means comprises control valve means including actuator means responsive to said electrical signal produced by said electrical summation amplifier means.

18. Apparatus in accordance with claim 11 wherein said monitor means comprises pressure transducer means for producing fluid pressures as indications of the actual performance of said processing system.

19. Apparatus in accordance with claim 18 wherein said regulating means comprises a final control element.

20. Apparatus in accordance with claim 19 wherein said error means comprises pressure responsive means for producing fluid pressures proportional to the difference between said fluid pressures applied thereto by said pressure transducer means and a control point to which said pressure responsive means is set, said control point corresponding to said predetermined standard of performance.

21. Apparatus in accordance with claim 20 wherein said first means comprises fluid pressure proportional control means whereby said first representations are fluid pressures linearly proportional to said fluid pressures produced by said pressure responsive means; said second means comprises fluid pressure reset control means whereby said second representations are fluid pressures proportional to the integral of said pressures produced by said pressure responsive means; and said third means comprises fluid pressure rate control means whereby said third representations are fluid pressures proportional to the rate of change of said simulated indications of said operation.

22. Apparatus in accordance with claim 21 wherein said combining means comprises means in fluid communication with said fluid pressure proportional control means, said fluid pressure reset control means and said fluid pressure rate control means such that said control function is a fluid pressure proportional to said fluid pressures produced by said fluid pressure proportional control means plus said fluid pressures produced by said fluid pressure reset control means plus said fluid pressures produced by said fluid pressure rate control means.

23. Apparatus in accordance with claim 20 wherein said simulated indications of said performance produced by said model are characterized as fluid pressures and wherein said first means, said second means, said third means and said combining means are included in a proportional-plus-reset-plus derivative stack-type fluid pressure control means for producing said control function characterized as a fluid pressure.

* * * * *